H. O. NEFF.
LAWN MOWER SHARPENER.
APPLICATION FILED SEPT. 2, 1909.
965,926.
Patented Aug. 2, 1910.
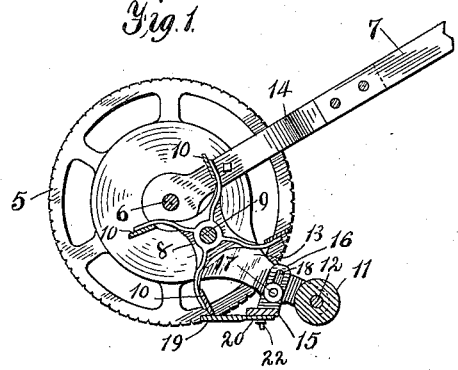
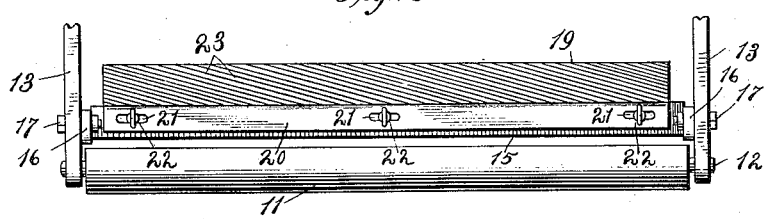
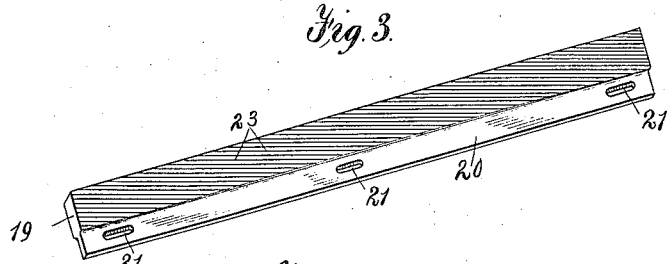
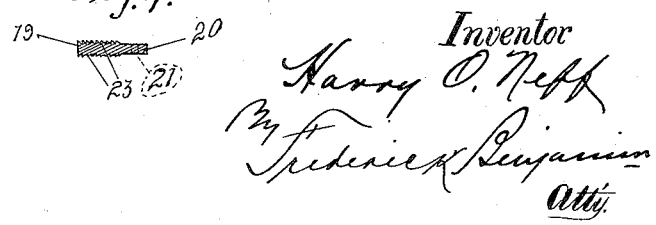
Witnesses:
Chas. F. Bassett
M. A. Milord
Inventor
Harry O. Neff
By Frederick Benjamin
Atty.

UNITED STATES PATENT OFFICE.

HARRY O. NEFF, OF JOPLIN, MISSOURI, ASSIGNOR OF ONE-HALF TO HENRY W. GERKE, OF JOPLIN, MISSOURI.

LAWN-MOWER SHARPENER.

965,926.  Specification of Letters Patent.  Patented Aug. 2, 1910.

Application filed September 2, 1909. Serial No. 515,920.

*To all whom it may concern:*

Be it known that I, HARRY O. NEFF, a citizen of the United States, residing at Joplin, in the county of Jasper and State of Missouri, have invented certain new and useful Improvements in Lawn-Mower Sharpeners, of which the following is a specification.

My invention relates to grinding or sharpening devices and has especial reference to apparatus designed for sharpening the knives used in lawn mowers and kindred machines, the particular type of knife to the grinding of which my appliance is especially adapted being that used in rotary cutters.

The chief object of the improvements which constitute the subject matter of this application for patent, is:—to furnish a device for the purpose stated that can be substituted for the stationary knife which is arranged to coöperate with the rotary cutter in machines of the class under consideration, and when so assembled will be in a proper position to operate upon the knife edges as they rotate, the cutting mechanism being operated by making traction upon the machine in the usual manner for operating it as a grass mower.

In carrying out this plan it is a further aim to produce an exceedingly simple device for accomplishing the results sought; to furnish a sharpener that will operate upon the knife edges when the latter are revolving in their proper direction for cutting, thus meeting the abrading material in such a manner that the grinding stroke will be from the edge to the heel of the blade, in this way preventing the formation of a feather edge and leaving the knife keen and in the best possible shape to perform the work to which it is adapted.

A very great advantage will be noticed in the simplicity of the abrading member, which consists of a single piece of steel supplied with file surfaces and the convenience with which it can be assembled in position for grinding; and when so adjusted the sharpening operation can be done quickly and easily with the expenditure of a minimum amount of muscular effort.

The above results are accomplished by the employment of the device illustrated in the accompanying drawing, which forms a part of this application, the details of construction and manner of attaching to a lawn mower being disclosed in the following views:—

Figure 1 is a sectional elevation of a lawn mower to which my sharpening device is shown attached to the knife bar in lieu of the straight knife; Fig. 2 is a fragmentary view, enlarged, showing the under side of the knife bar and roller with the abrader or sharpening tool assembled on said bar; Fig. 3 is a perspective view of the abrading member; Fig. 4 is a transverse section of the abrading members.

Referring to the details of the drawing, the numeral 5 indicates one of the driving wheels, 6 the main shaft connecting the said driving wheels, 7 the handle and 8 a rotary reel, mounted on a shaft 9, and having the usual knives 10, which co-act with the straight knife (not shown) to form a cutting mechanism. These devices are common in mowers of this type and may be modified in any manner desired. A roller 11 is mounted on a shaft 12, the ends of the latter being journaled in the rear end of a pair of bracket arms 13, only one of these arms being shown in the sectional view. Said bracket arms are carried on the main shaft 6 at their forward ends in the usual manner, and have the bent fork members 14 of the handle fixed thereto. The rear ends of these bracket arms are connected together by a knife bar 15, the ends of the bar having upwardly extending hangers 16, secured to said brackets by bolts 17, which pass through slots 18 in the hangers, thus allowing of a vertical adjustment of the knife bar.

In the drawing, the straight knife blade is removed and in its place is assembled a grinding or abrading member 19. This member is in the form of a flat plate or bar of steel having its rear portion 20 made thinner to adapt it to be properly attached to the under surface of the knife bar in the manner shown in Fig. 1. This reduced portion 20 is provided with a suitable number of slots 21 for the passage of the securing bolts 22, which are preferably made in wing form so that they may be screwed in or out with the fingers, thus avoiding the necessity of using a tool for this purpose; it being understood that the screws or bolts employed for securing the knife blade in position may be used if desired. The purpose of the slots 21 is to permit the member to be adjusted longitudinally so that it may be used when there are variations in the spacing of the bolt holes in the knife bar 15. The forward, thicker portion of the said abrading member is provided with a file surface 23 applied upon both sides, so that when one side becomes worn and dull the tool may be reversed and the opposite side presented to the work. If desired the opposite sides of the file part may be supplied with different cuts so that one face will be coarser than the other. The direction of the file teeth 23 may be longitudinal or diagonal, and I prefer the latter arrangement, the preferable angle being that shown, which is approximately 15 degrees with the file edge. The said member 19 will of course be made of steel of suitable quality, and brought to the requisite degree of file hardness so as to render sufficient service.

To assemble the sharpening member or file, the usual straight knife blade is removed from the knife bar 15 and the file 19 secured in position, using the same bolt holes, and if preferred the same bolts or screws employed to fasten the knife as previously mentioned. The knife bar is then adjusted by means of the bolts 17 until the file surface that is uppermost is tangent to the circle described by the edges of the rotary blades 10 and placed so that it just touches the blades as they revolve. The lawn mower is then run forward upon the ground in the usual manner for cutting, and as the reel revolves the knife edges will be acted upon by the file surface.

After running the mower a short distance the file should be set up against the blades and the mower again operated. In this manner a very keen and true edge will be put upon the revolving knife blades, and with the expenditure of a very little effort. The arrangement will produce an equal grinding result when the mower is run in either direction.

Having thus described my invention what I claim as new, is:—

1. A lawn mower sharpener, consisting of a flat bar of suitable material having file surfaces on its opposite sides and having a smooth portion reduced in thickness and provided with slots adapted to receive means for attaching the bar to a lawn mower.

2. A lawn mower sharpener comprising a flat bar of steel having a file surface extending over a portion of one side of the bar, the remaining portion of the side being smooth and provided with apertures for fastening members.

In testimony whereof I affix my signature in the presence of two witnesses.

HARRY O. NEFF.

Witnesses:
S. H. STEPHENS,
E. CARMICHAEL.